W. C. FARNUM.
FEEDING MECHANISM FOR BORING MACHINES.
APPLICATION FILED NOV. 24, 1909.

1,071,305.

Patented Aug. 26, 1913.
5 SHEETS—SHEET 1.

W. C. FARNUM.
FEEDING MECHANISM FOR BORING MACHINES.
APPLICATION FILED NOV. 24, 1909.

1,071,305.

Patented Aug. 26, 1913.
5 SHEETS—SHEET 2.

WITNESSES
Geo. F. Haughtal
H. S. Phillips

INVENTOR
WILLIAM C. FARNUM.
BY Franklin Scott, ATTORNEY.

W. C. FARNUM.
FEEDING MECHANISM FOR BORING MACHINES.
APPLICATION FILED NOV. 24, 1909.

1,071,305.

Patented Aug. 26, 1913.
5 SHEETS—SHEET 5.

WITNESSES

INVENTOR
WILLIAM C. FARNUM.
BY Franklin Scott, ATTORNEY.

UNITED STATES PATENT OFFICE.

WILLIAM C. FARNUM, OF FITCHBURG, MASSACHUSETTS, ASSIGNOR TO U. S. BOBBIN & SHUTTLE COMPANY, OF PROVIDENCE, RHODE ISLAND, A CORPORATION OF NEW JERSEY.

FEEDING MECHANISM FOR BORING-MACHINES.

1,071,305.      Specification of Letters Patent.    Patented Aug. 26, 1913.

Application filed November 24, 1909. Serial No. 529,821.

*To all whom it may concern:*

Be it known that I, WILLIAM C. FARNUM, of the city of Fitchburg, in the county of Worcester and Commonwealth of Massachusetts, have invented certain new and useful Improvements in Feeding Mechanism for Boring-Machines, of which the following description, in connection with the accompanying five sheets of drawings, constitutes a specification.

This invention is designed for the purpose of feeding blanks from a hopper or feed trough one at a time to the chucks or other blank-holding devices of a machine for boring longitudinal holes through them. Its function is to select a single blank from a receptacle and transfer it to the proper place and position for it to be grasped or seized by jaws or grippers by which it is presented to the boring tool of the boring machine to be operated upon.

The invention as herein illustrated is shown as an attachment to the boring machine which forms the subject-matter of my application for patent No. 462,209, filed November 12, 1908, which is now pending in the United States Patent Office. The parts of the machine shown in that application which also appear in this are designated by numerals, while the parts which relate to the subject-matter of this case are designated by letters. The machine shown in the former application is designed for boring bobbins and other analogous articles and these feeding devices are adapted to coöperate with that machine but are susceptible of various other applications.

Figure 1:
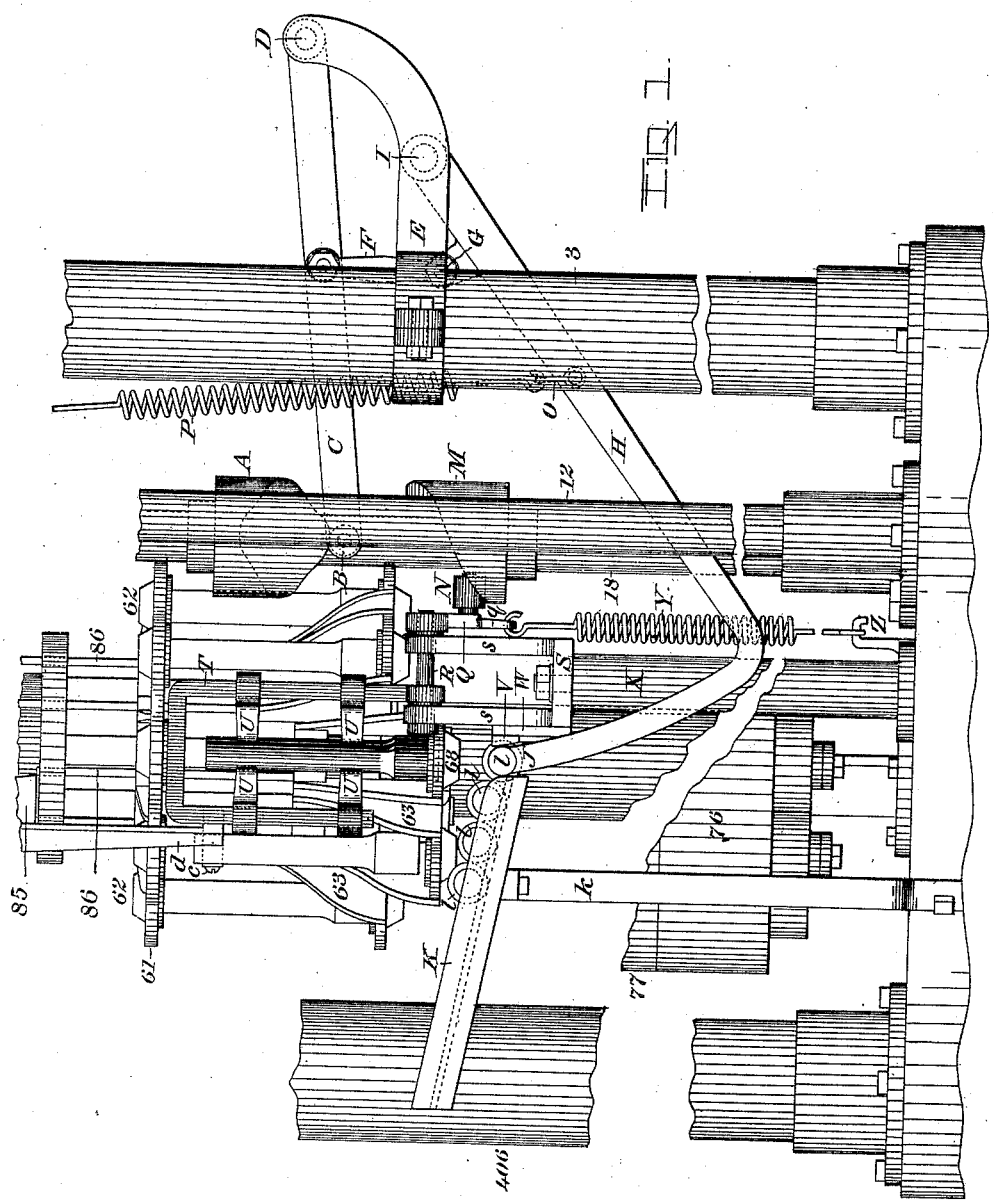
Figure 2:
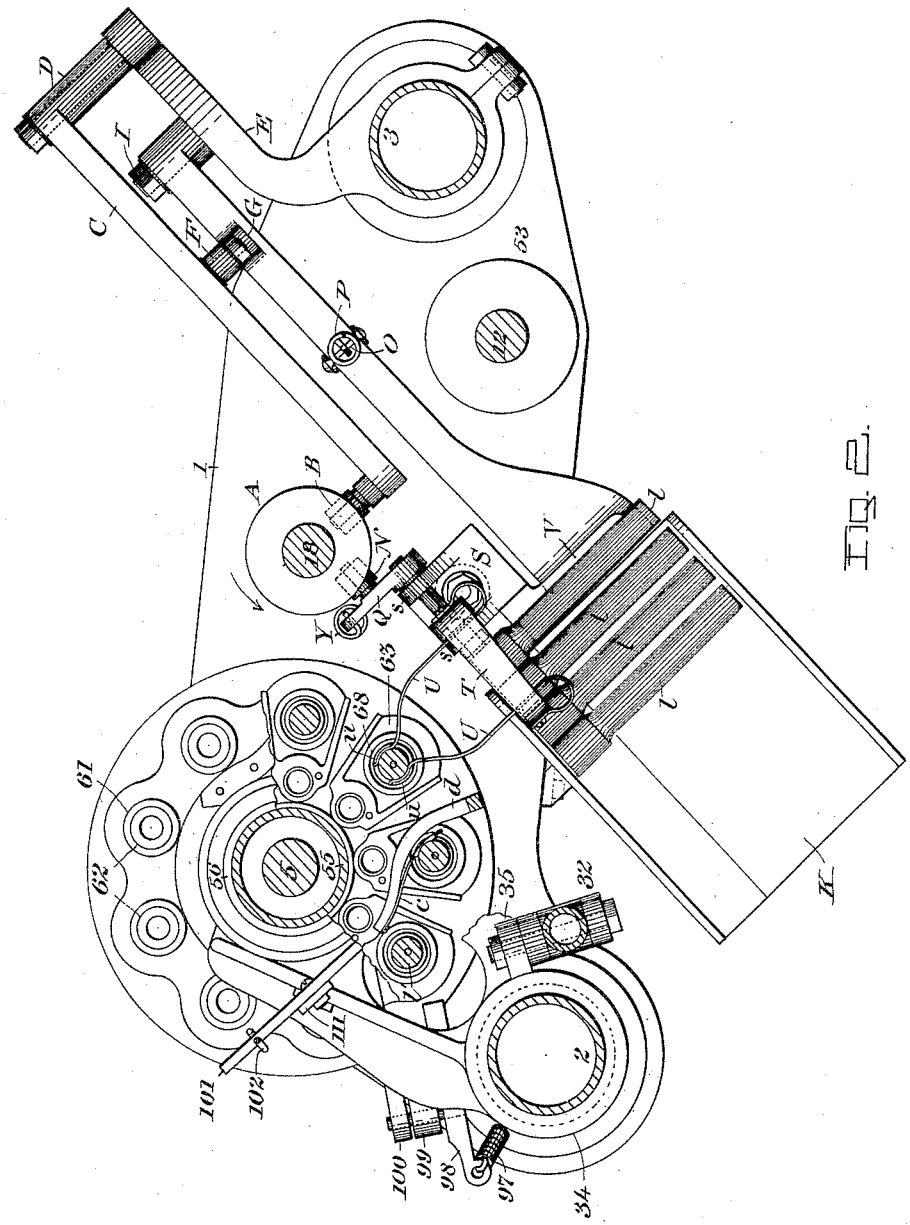
Figure 3:
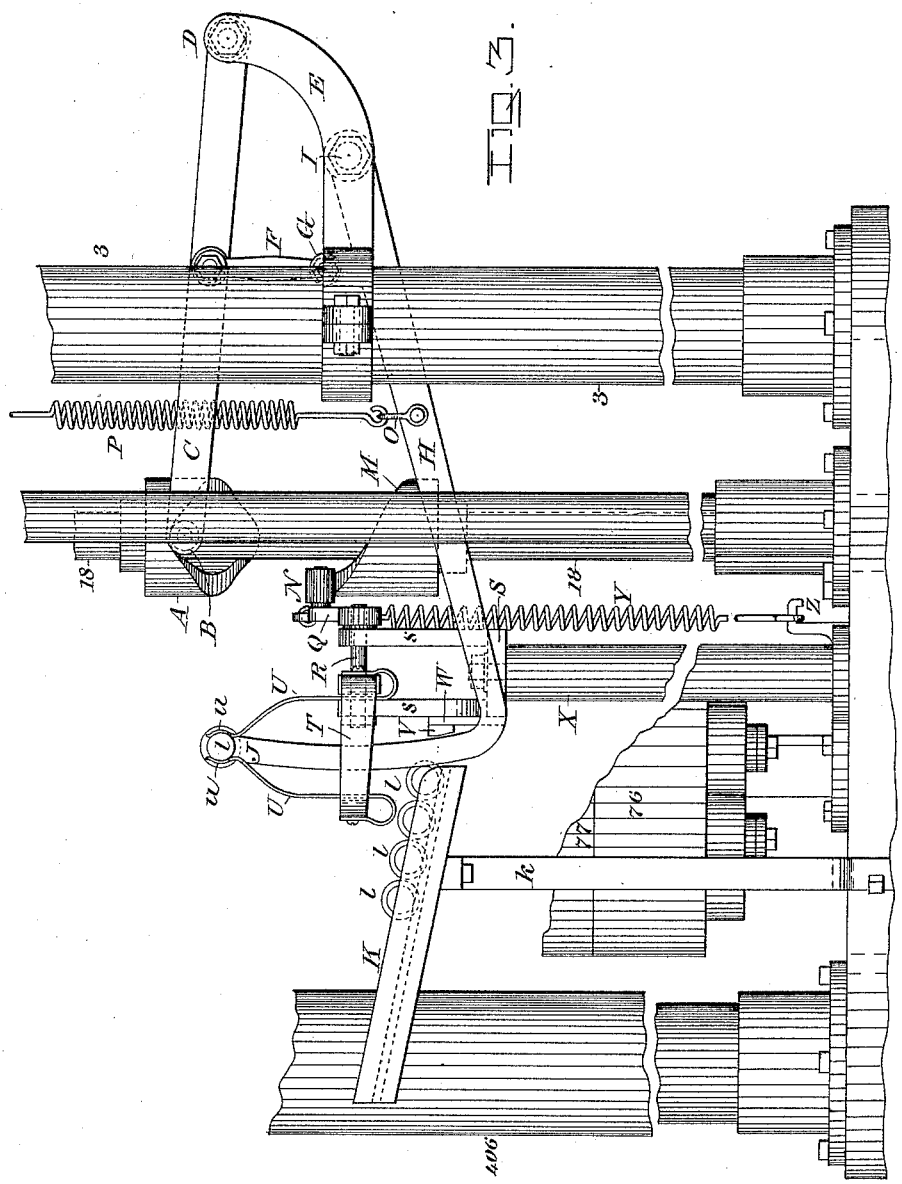
Figure 4:
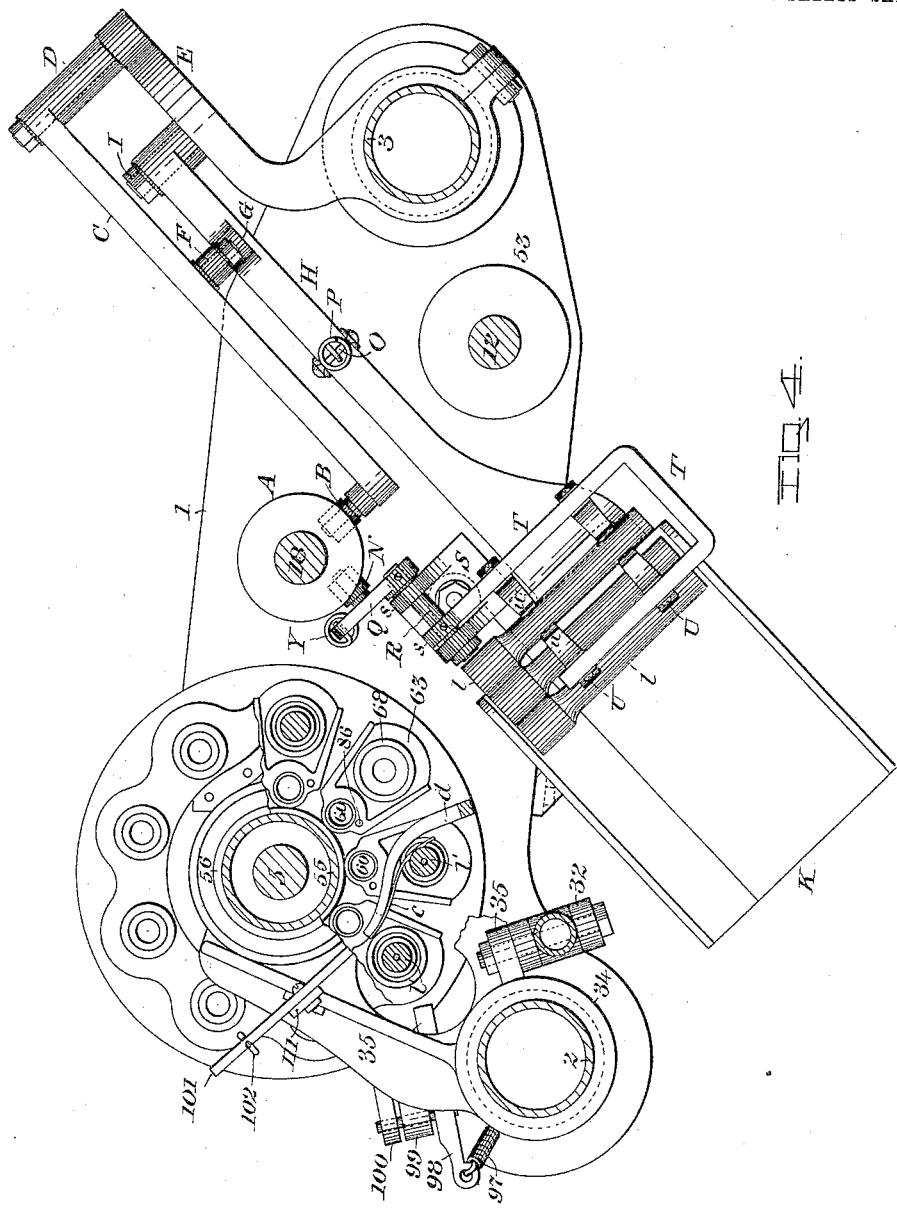
Figure 5:
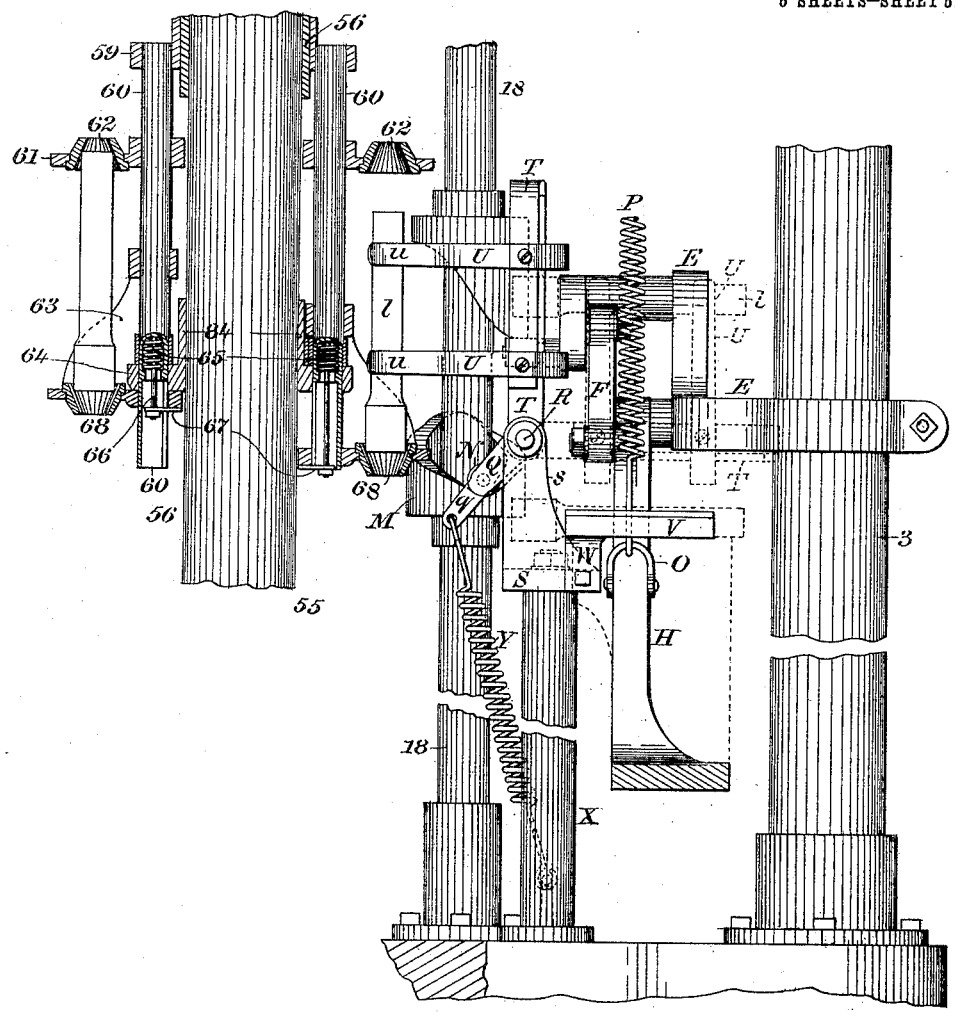

The invention is fully illustrated in the drawings wherein—
Figure 1 shows a front elevation of the invention as applied to the boring machine above referred to. Fig. 2 is a horizontal plan of the same. Fig. 3 is a similar front elevation of the invention showing the blank-lifter in its second position. Fig. 4 is a similar horizontal plan of the parts and positions shown in Fig. 3. Fig. 5 is a side elevation of the parts and positions shown in Fig. 1.
The machine shown in the drawings to which this invention is applied has a fixed, hollow tubular standard shown in cross-section at 55 in Figs. 2 and 4 upon and around which a sleeve 56 can both reciprocate and rotate. On this sleeve are fixed an upper and a lower reel-head 59 and 64 respectively, which heads are connected by tubular slides 60, 60, which are rigidly connected with the heads, as best seen in Fig. 5. Upon the slides
60 60 a chuck-plate 61 is mounted and is vertically adjustable thereon to accommodate different lengths of blanks. This is shown in partial plan in Figs. 2 and 4 and has a series of jaw-seats arranged concentrically around the standard 55 and equally spaced. In each seat a hollow conical chuck-jaw 62 is fixed which receives and holds the upper end of the blank when placed therein. The bottom end of the blank rests in a similar chuck-jaw 68 which is seated in an opening in a jaw-slide 63, one of which is provided for each slide 60. These chuck-slides 63 have limited reciprocatory movement on the slides 60, the downward for the purpose of opening the jaws to permit a finished blank to be discharged and the upward for the purpose of seizing and holding the blank presented to it by the feeding devices. Chuck slide 63 is provided with a stem or rod 86, seen in Fig. 1, which, when the chuck-reel by its intermittent rotation around the standard 56, carries it under cam 85, Fig. 1, will be pushed down by that cam into the position shown at the right hand of standard 55 in Fig. 5. Its upward movement is accomplished by the expansive action of spring 65 which is seated on a shoulder on the inside of the pipe-slide 60 with its upper end under a button or nut on the upper end of rod 66, Fig. 5. The lower end of this rod passes through a lifting clip 67, to which it is held by a nut, the clip projecting under the under side of the chuck-jaw 63 so that its upstroke will carry the jaw with it. The blank is held in the grasp of the chuck-jaws by the expansive force of spring 65 which acts to draw them toward each other. The chuck-jaw 63 is released so that spring 65 can act by a slight backward movement of cam 85 which is effected by mechanism shown in the aforesaid boring machine and which uncovers the top of rod 86 thus leaving spring 65 free to act. The heads 59 and 64 together with the pipe-slides 60, collectively make up a reel for the carriage of the chucks and in this case is called the "chuck-reel". It has imparted to it by mechanism not shown, a vertical reciprocatory motion on standard 55 for pressing the blanks which it may carry down upon the boring tools, and a step-bystep rotatory motion around said standard between the said reciprocations to advance the blank by progressive stages from one tool to the next. The devices for effecting this intermittent rotatory motion are also not shown.

We now come to the mechanism of the invention under consideration.

Upon a column or other suitable support 3, a bracket E is fixed. This bracket is held by a clamping collar so that its elevation can be varied. On a fulcrum pivot I the lifting arm H is pivoted. This arm is a lever of the third class. Its free end is bent to the arc of a circle of which the pivot I is the center, the upper extremity of the arc J being broadened and concaved as seen in Figs. 1 and 3 so that a cylindrical blank 1 can lie horizontally therein. This lifting arm is actuated by the lever C which is pivoted to the bracket E at D and is connected with said arm by the link F which is pivoted to the same at G. Lever C is provided with a friction roller or truck B which runs against the face of a cam A on shaft 18 and is held in contact with the same by a strong retractile spring P, which spring is attached at its lower end to the arm H by the stirrup O and has its upper end securely attached to some fixed point above. Its contraction, by raising arm H will through the link F and its connection with lever C raise that lever and thus hold the roller B against the face of cam A. This arrangement whereby the blanks are fed to the machine by the contractile spring P, prevents any injury to the parts of the feeding devices in case a blank gets displaced or into a position to clog or stop the movement of the feeding devices, as in any case only the strength of the spring acts upon such parts in the feeding operation.

The blanks to be handled, which in this case are bobbin blanks, marked 1, 1, 1, are arranged in parallel order in a sloping chute K, with their butts lying in the same direction as seen in Figs. 2 and 4. The incline of the chute impels the blanks to roll to the lowest point as seen in Fig. 1, where they bring up against a stop V, and resting on the concave edge J of the lifter H. So placed, the blank 1 is in position to be lifted to the position where it can be seized by the clenching tongs preparatory to its erection and delivery to the chuck. The clenching tongs consist of two spring blades U, U, which have curved lips $u$ $u$ at their ends to encircle and grip the blank. These blades are attached to a vibrating yoke T which has one long leg by which it is rigidly attached to the rockshaft R, Fig. 1. This rockshaft is carried on a stand S, mounted on the post X. It is fitted with a crank arm Q, Fig. 3, which carries a roller N, that runs on the edge of cam M on shaft 18. A retractile spring Y connects the free end of crank Q with a fixed attachment Z, so that its contraction will swing the clenching tongs from a vertical position over backwardly to a horizontal position, or from the dotted position seen in Fig. 5, to the full-line position there shown.

The relative arrangement of the retroverting cam M to the other coöperative parts is such that the rising movement of the lifting arm H, and the upthrow of the gripper blades U, U, from the horizontal position as in Fig. 2, to the vertical position seen in Fig. 3 are concurrent, but so timed that the blades will reach their working position slightly in advance of the completion of the stroke of the lifting arm H. That is to say, they should be in position to grasp the blank when it is forced between them by the rising stroke of the lifting arm, as will be explained in describing the action of the machine.

The operation of the machine is as follows: The feeding devices involved in this invention, and those by which the chuck-reel is reciprocated and rotated upon and around the standard is the shaft 18. One turn of this shaft effects one reciprocation of the chuck-reel and rotates it one step in the successive boring operations, that is, it rotates the reel so as to carry each blank from one bit or drill to its true position to be engaged by the next one, and feeds one blank to one of the chucks of the reel. This feeding of the blank to a chuck occurs during the downward stroke of the reel immediately preceding the closing of the chuck-jaws following their release by the action of cam 85. Assuming the machine to start from the attitude shown in Fig. 1 with the chute K charged with blanks, one of which has rolled into position in the slot over the arc J and resting thereon, and roller B standing on the high point of cam A, further rotation of that cam will carry the high point off the roller B thereby leaving it free to follow up the cam under the stress of spring P through lifting arm H, to which it is attached, link F, and lever C, on which roller B, is mounted. This contraction of spring P raises the lifting arm thereby carrying with it the blank 1 toward the position seen in Fig. 3. While this movement of the lifting arm is in progress, rockshaft R, crank arm Q, and roller N, under the action of cam M, will commence to rotate to swing the gripper blades U, U, from their horizontal position as in Fig. 5, to the vertical as in Fig. 3, which position will be reached just ahead of the blank carried by the lifter which blank will be forced between the lips $u$, $u$, as the lifter reaches the upper limit of its stroke. The blades U, U, are spring blades and when unoccupied by a blank their upper ends will close together, so that the insertion of a blank by the lifting arm forces them apart to grasp it, which they firmly do. The movements of the lifting arm and of the gripper blades just described involve a partial turn of shaft 18, during which operation the chuck reel is making its down stroke while the boring of the blanks is being effected. The remaining partial turn raises the chuck reel, rotates the gripper blades and drops the lifting arm. When the blank has been deposited in position to be seized by the chuck-jaws, the cam 85 above the rod 86 is turned backward by appropriate mechanism so as to uncover the top of rod 86 thus leaving spring 65 free to project the jaw 63 up against the bottom of the blank which lies in its path as seen in Fig. 1, and drives the top of the blank into the conical chuck seat of the jaw 62 above it. The instant this is accomplished the blades retreat and the reel goes down impaling the blank on the first bit, it then rises and rotates a step to bring into position another pair of jaws, the cam 85 in the meantime having been restored to its dormant position so that its front end will cover rod 86 of the open chuck-jaw beneath it. The coöperative parts are then in position to repeat the same operations.

The means provided for discharging the blanks after they have been bored consist of a leaf spring $c$, Figs. 1 and 2, which is attached to a fixed bracket $d$, the outsprung or free end of which lies in the path of a blank as it is carried around by the reel. When such a blank in its progress engages the end of the spring $c$, it presses it backward, and when further rotation of the reel carries the top of rod 86 under cam 85 by which the sliding jaw is depressed, such depression liberates that blank, whereupon spring $c$, becomes active and throws the blank out of the machine.

I therefore claim as my invention and desire to secure by Letters Patent the following:

1. In a device of the character described, the combination of a vertically arranged blank holding chuck comprising opposed jaws, a blank feeding apparatus comprising a support adapted to feed the blanks while in a horizontal position, a device for intermittently selecting one blank at a time from said support and moving it vertically so as to deliver it directly to a transmitting device, a pivotally mounted device for transmitting said selected blank from a horizontal position on the selecting device to a vertical position between the jaws of said chuck, and means actuating the jaws of said chuck to seize and hold said blank.

2. In a device of the character described, the combination of a vertically arranged chuck consisting of two opposed gripping jaws, a horizontally extending receptacle for holding the blanks, said receptacle having an opening through its wall for the passage of a lifter, a blank lifter adapted to reciprocate through said opening, a movable gripping device interposed between said blank lifter and said chuck jaws for seizing and transferring the blank from the lifter to its position to be grasped between the chuck jaws, and means for actuating said lifter, gripping jaws and transferring device, substantially as described.

3. In a device of the character described, the combination of a blank holding chuck, a blank holding feed chute having a transverse slot through its bottom adapted to receive and retain in proper horizontal position one blank, a lifter adapted to play vertically through said slot and to capture and elevate a blank lying therein, a rocking device provided with gripping appliances to receive and hold said blank when delivered thereto by said lifter, and means for rocking said gripping devices so as to revolve said blank from a horizontal to a vertical position between the chuck jaws of said chuck.

4. The combination with a vertically arranged chuck having opposed relatively movable jaws, a receptacle in the form of a chute adapted to feed blanks while in a horizontal position, means adjacent one end of the chute for engaging and holding the lowermost blank in a horizontal position, and transfer mechanism interposed between said receptacle and the chuck for successively taking said lowermost blank from the receptacle, imparting a turn thereto, and delivering the same in a vertical position between the jaws of said chuck.

5. The combination with an inclined delivery chute arranged to support blanks lengthwise, of a stop arranged adjacent the lower end of the chute and separated from the latter and an elongated lifting lever pivoted at one end to swing vertically and having an offset free end constructed to support and engage partially around a blank positioned between the lower end of the chute and said stop and adapted to lift said blank upwardly to a point removed from the chute, a vertically arranged rotary chuck reel, and a transfer member interposed between the reel and chute and adapted to take the blank from said lifting lever and turn the same from a horizontal to a vertical position and place the blank upon the reel.

6. In a device of the character described, the combination of a vertically arranged chuck, comprising opposed clamp jaws, a yoke shaped device, a horizontally extending rock shaft connected thereto, spring arms projecting from the opposite arms of said device and coöperating together to hold a blank, means for operating said rock shaft so as to move the blank from a horizontal to a vertical position whereby the blank is positioned between said chuck jaws, a blank support, and pick up means to engage a blank on said support and position the same between said spring arms when the yoke is in horizontal position.

7. In a device of the character described, the combination of a vertically arranged chuck, comprising opposed clamp jaws, a yoke shaped device, a horizontally extending rock shaft connected thereto, spring arms projecting from the opposite arms of said device and coöperating together to hold a blank, means for operating said rock shaft so as to move the blank from a horizontal to a vertical position whereby the blank is positioned between said chuck jaws, a horizontally extending blank support, and a vertically movable lifting device adapted to successively engage the blanks on the support and lift the same between the spring arms of the yoke when the latter is in horizontal position.

8. In a device of the character described, the combination of a vertically arranged chuck, comprising opposed clamp jaws, a yoke shaped device, a horizontally extending rock shaft connected thereto, spring arms projecting from the opposite arms of said device and coöperating together to hold a blank, means for operating said rock shaft so as to move the blank from a horizontal to a vertical position whereby the blank is positioned between said chuck jaws, said means including a rotatable cam member and a part to engage said cam member projecting from said yoke member, a blank support, and pick up means to engage a blank on said support and position the same between said spring arms when the yoke is in horizontal position.

9. In a device of the character described, the combination of a vertically arranged chuck, comprising opposed clamp jaws, a yoke shaped device, a horizontally extending rock shaft connected thereto, spring arms projecting from the opposite arms of said device and coöperating together to hold a blank, the said yoke member being movable from a horizontal to a vertical position, spring means for normally holding the yoke device in horizontal position so as to receive a blank, means acting in opposition to the spring means to move the yoke device to a vertical position so as to position the blank between the chuck jaws, a horizontally extending support for the blanks and a lifting device for the blanks interposed between said support and the yoke member.

10. In a device of the character described, the combination of a vertically arranged chuck including opposed clamping jaws, of a blank carrying member adapted to move from a horizontal to a vertical position, spring means for normally holding said blank carrying member in horizontal position so as to receive a blank, cam means acting in opposition to the spring means to move the blank carrying member from a horizontal to a vertical position whereby to position the blank relative to the chuck jaws, and means for positioning the blanks on said blank carrier.

11. In a device of the character described, the combination of a vertically arranged chuck including opposed clamping jaws, of a blank carrying member adapted to move from a horizontal to a vertical position, spring means for normally holding said blank carrying member in horizontal position so as to receive a blank, cam means acting in opposition to the spring means to move the blank carrying member from a horizontal to a vertical position whereby to position the blank relative to the chuck jaws, an inclined horizontally extending feed chute for blanks, and a vertically movable lifting device adjacent the lower end of said chute and adapted to lift the blanks in position on said blank carrier when the latter is in horizontal position.

In testimony whereof I have hereunto subscribed my name in the presence of two witnesses.

WILLIAM C. FARNUM.

Witnesses:
   LAURENCE H. GERTH,
   ROBT. E. BEECHER.